J. WALDRON.
METHOD OF MAKING PRINTING ROLLS.
No. 188,320. Patented March 13, 1877.
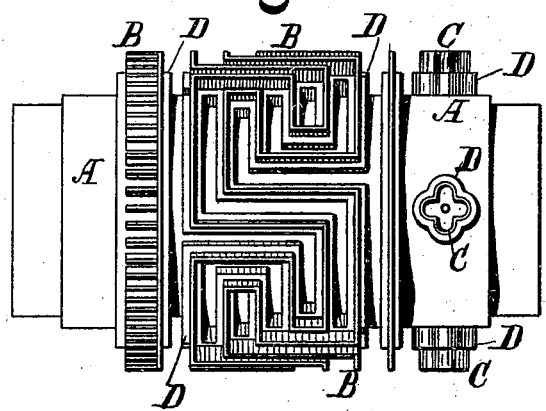
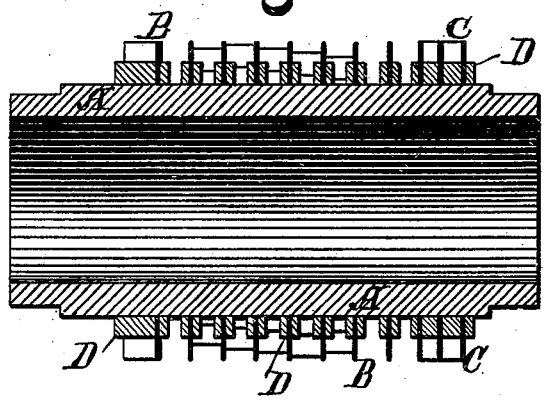

UNITED STATES PATENT OFFICE.

JOHN WALDRON, OF NEW BRUNSWICK, NEW JERSEY, ASSIGNOR OF ONE-HALF HIS RIGHT TO JACOB J. JANEWAY, OF SAME PLACE.

IMPROVEMENT IN METHODS OF MAKING PRINTING-ROLLS.

Specification forming part of Letters Patent No. 188,320, dated March 13, 1877; application filed June 29, 1876.

*To all whom it may concern:*

Be it known that I, JOHN WALDRON, of New Brunswick, in the State of New Jersey, have invented a new and useful Improvement in Method of Making Printing-Rolls, of which I hereby declare the following specification to be a full, clear, and precise description, sufficient to enable others skilled in the art to which it appertains to comprehend and employ it.

This invention is an improvement upon that process of making printing-rolls which is known as the "Janeway process," patented by Jacob J. Janeway upon the 13th day of June, A. D. 1876, as No. 178,528. Its object is the manufacture of a lighter roll than is possible by the use of said process, in which, no matter how scattered or occasional are the figures, it is necessary that the layer of metal which secures the plates forming them in place should completely surround the shaft, inasmuch as there is no sufficient affinity between the molten type-metal of the layer and the iron of the shell to hold the two together unless the layer completely envelops the shell—an objection having especial force when the figures are small, few in number, and do not streak or band the roll in a continuous line, as in the case of "wall of Troy" or other bordering. Moreover, the waste of metal is great in view of the unnecessary surplusage of layer.

Figure 1 of the drawing is an elevation of a roll made by my improved process, and Fig. 2 a central longitudinal section of the same.

Similar letters of reference indicate corresponding parts.

In the drawing, A represents a shell made of tin-plate, or tinned in portions; B, outline-plates; C, outline-pins, and D the layer of soldering material.

The following is a description in detail of my invention:

The shell or shaft A is, by any suitable means, marked off in the figures desired to be set upon it, and such portions of its surface as are to be covered by occasional or non-continuous figures—figures other than those which streak or band it directly around—are tinned or galvanized by the muriatic or other suitable process, to the end that such portions may combine with the molten coating, so as to form a solder to retain the pins in position. After the plates or pins are set up in the wax, and the plaster-of-paris has been applied, and has hardened, so much wax only is removed as immediately surrounds the particular plates and tinned portions of the roll, (the boundaries of the flowing out being determined by removable bounding-plates, or like devices set up in the wax around the figures,) and into the spaces made vacant by the flowing out of the wax, molten lead, tin, type-metal, or other fit alloy, is run, forming, with the tin of the shell, a solder or casting, which firmly fastens the layer and pins to the shell, rendering it impossible for them to drop off the shell, although only covering a very limited area upon its surface, as represented by the pins C.

It is obvious that the special improvement in this my process is in the saving of metal, and consequent weight in the layer, because the layer is only requisite in and about the figures themselves, and can be there retained without enveloping the entire shell, whereby the weight of the roll is much lessened.

I am aware that it is old to solder outline castings upon metal rolls. I am also aware that it is old to construct rolls of tin; and I desire to disclaim, broadly, such methods, and to limit myself to the following, which I do claim and desire to secure by Letters Patent of the United States:

The improved method of manufacturing outline plate printing rolls under the Janeway process, by tinning such portions of the surface of the roll as are to be occupied by isolated or non-continuous figures, and pouring in molten type-metal immediately about the pins or plates forming said figures upon the portions tinned, to the end that it may unite with the tin to form a solder securing pin and layer to the rolls, substantially as described.

JNO. WALDRON.

Witnesses:
J. BONSALL TAYLOR,
OWEN DORCY.